UNITED STATES PATENT OFFICE.

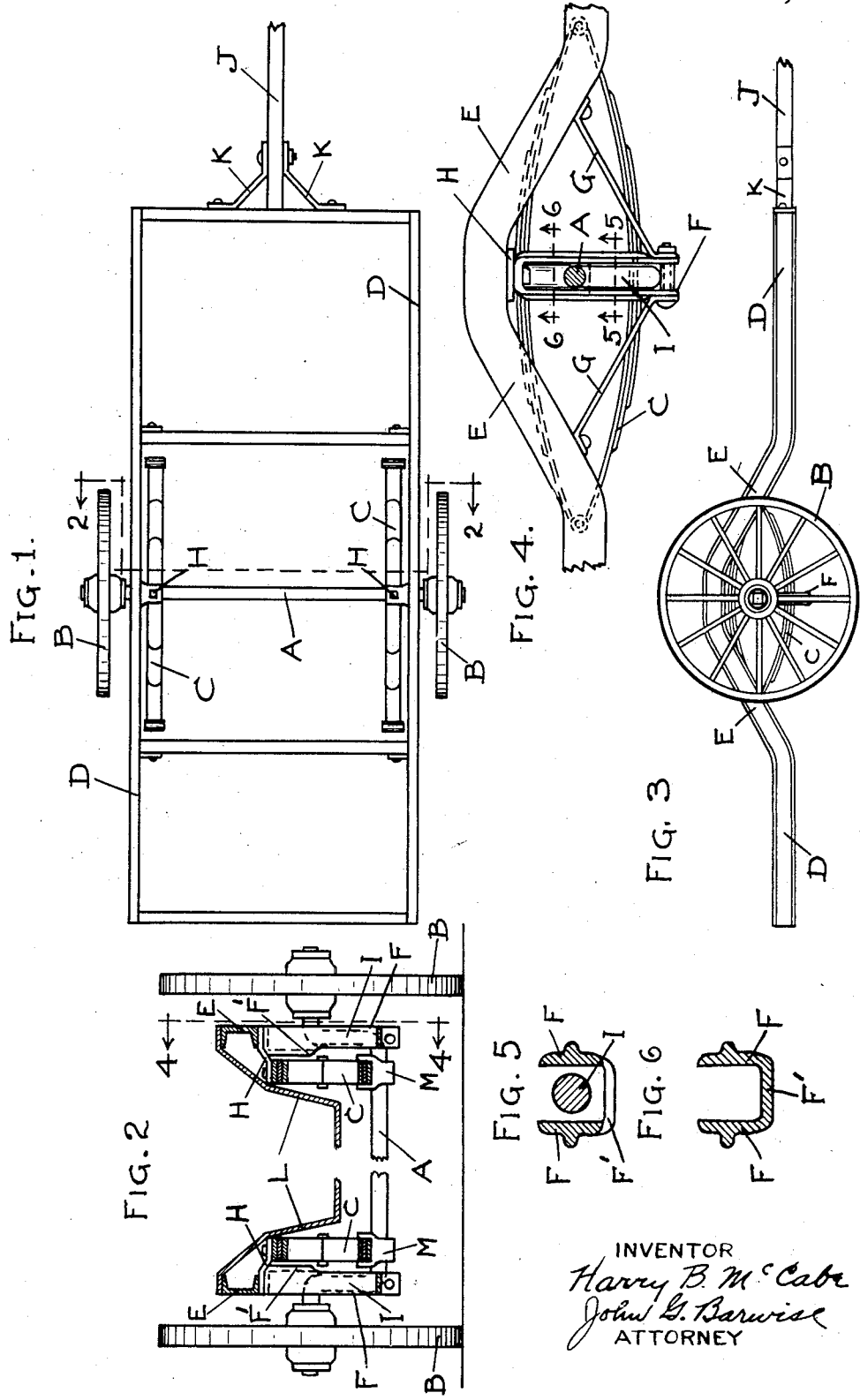

HARRY B. McCABE, OF MOUNT PLEASANT, IOWA.

TRAILER FOR VEHICLES.

1,400,300. Specification of Letters Patent. Patented Dec. 13, 1921.

Application filed December 2, 1920. Serial No. 427,723.

*To all whom it may concern:*

Be it known that I, HARRY B. McCABE, a citizen of the United States, residing at Mount Pleasant, county of Henry, and State of Iowa, have invented a new and useful Improvement in Trailers for Vehicles, of which the following is a specification.

My invention relates to improvements in trailers for vehicles. In loading trailers of the ordinary type, the commodity to be transported must be lifted a considerable height before being placed on the body of the vehicle, thereby entailing considerable effort, particularly so in all kinds of farm work. The object of my invention is to provide a low-bodied trailer, and the invention consists in the improvements and novel arrangement of the body frame with the springs and axle, and in other features hereinafter described and more definitely set forth in the claims.

In the accompanying drawings forming a part of this specification, Figure 1 is a plan view of a trailer embodying my invention. Fig. 2 is a cross section view on the line 2—2 in Fig. 1. Fig. 3 is a side view and Fig. 4 an enlarged detail view on line 4—4 of Fig. 2, looking in the direction of the arrow. Figs. 5 and 6 are cross section views on the lines 5—5 and 6—6 respectively of Fig. 4.

Referring to the drawings, A represents an axle of the drop or crank axle type, supporting the wheels B. A pair of springs C are secured to the main body of the axle A, which may be by means of clips M, and the body frame D is attached to the springs as described hereafter.

The body frame of the trailer D is preferably made of channel iron although other suitable materials may be used. The portions E of the body frame D, immediately over the axle are upwardly bent as shown in Figs. 3 and 4.

To prevent lateral movement of the downwardly projecting parts of the axle I, I employ guide members F, having slots which pass up and down as the weight on the body of the trailer is applied or removed therefrom. These guide members are rigidly secured to the upper central part of the bent portions E of the body frame and are braced at the bottom by the members G.

The upper inner sides of the guide members are inclosed by members F' and are preferably made integral with the guide members as shown in Fig. 6. With this construction when the springs are compressed, the downwardly projecting parts of the axle I slide into the upper part of the guide members thereby preventing lateral motion of the body of the trailer and preventing the hubs of the wheels from coming in contact with the guide members.

Blocks H are employed to connect the body frame with the springs C, and they are secured to the upper part of the springs C at the center and are attached to the upwardly bent portions E of the body frame above the guide members F. Extending from the floor of the trailer, which is not shown, to the bent parts E of the body frame, are shields L (Fig. 2) which cover the springs and prevent the contents of the load from falling to the ground. These shields are preferably made of sheet metal and are made to fit over the springs C, and be attached to the parts E of the body frame.

For connecting the trailer to the pulling vehicle, I use a tongue J which may be braced by the members K. The member J may be attached to and detached from the pulling vehicle by means of a hook and eye (not shown) or by any other satisfactory means.

What I claim is:

1. In a trailer for vehicles, comprising a crank axle with springs secured thereto, a pair of wheels supporting said axle in combination with a body frame supported by the springs and having opposite portions of the sides upwardly bent, and guide members for the axle secured to the underside of the upwardly bent portions of the body frame.

2. A trailer for vehicles consisting of a crank axle with springs secured thereto, a pair of wheels supporting said axle, a body with a frame having portions of its sides bent upwardly adjacent to the axle and supported by the springs, and guide members secured to the underside of the bent portions of the frame with braces connecting the lower portion of the guide members to the body frame.

3. In a trailer for vehicles comprising a crank axle with springs secured thereto, a pair of wheels supporting said axle in combination with a body frame supported by the springs and having portions of the sides, immediately over the axle upwardly bent, guide members for the axle secured to the underside of the bent portion of the body frame with braces therefor and a pair of shields connecting the bent portions of the frame with the floor of the body.

Mt. Pleasant, Iowa, November 19th, 1920.

In testimony whereof I affix my signature.

HARRY B. McCABE.